United States Patent
Hirokane et al.

(10) Patent No.: US 6,418,091 B1
(45) Date of Patent: Jul. 9, 2002

(54) MAGNETO-OPTICAL RECORDING MEDIUM HAVING OXIDIZED SIDE WALL BETWEEN LAND AND GROOVE

(75) Inventors: Junji Hirokane, Nara; Noboru Iwata, Tenri, both of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/461,799

(22) Filed: Dec. 15, 1999

(30) Foreign Application Priority Data

Dec. 15, 1998 (JP) .......................... 10-355830
Aug. 31, 1999 (JP) .......................... 11-244633

(51) Int. Cl.$^7$ .............................................. G11B 11/00
(52) U.S. Cl. ................................. 369/13.55; 369/13.35; 428/64.3
(58) Field of Search ..................... 369/13, 14, 110.01, 369/275.2, 275.4; 360/59, 114; 428/64.3, 694 ML, 64.4

(56) References Cited

U.S. PATENT DOCUMENTS 5,712,833 A * 1/1998 Ogihara et al. ............... 369/13
6,144,631 A * 11/2000 Kawano ....................... 369/13

FOREIGN PATENT DOCUMENTS

JP 6-290496 10/1994

OTHER PUBLICATIONS

"Magnetically Induced Superresolution Using Interferential In-Plane Magnetization Readout Layer," J. Hirokane, et al. Jpn. J. Appl. Phys., vol. 35, Part 1, No. 11, Nov. 1996, pp. 5701–5704.

* cited by examiner

Primary Examiner—Tan Dinh
(74) Attorney, Agent, or Firm—Dike, Bronstein, Roberts & Cushman IP Group Edwards & Angell, LLP; David G. Conlin; Timothy Carter Pledger (57) ABSTRACT

There are provided a magneto-optical disk, a super-resolution magneto-optical disk and a domain wall moving magneto-optical disk whose cross-talk, cross-write and cross-erasure are suppressed and whose recording density is improved. A recording magnetic layer formed on a land is shut off magnetically from the recording magnetic layer formed on a groove and thermal diffusion in the track direction is suppressed, by selectively oxidizing a magnetic layer formed on a side wall between the land and the groove.

10 Claims, 4 Drawing Sheets

MAGNETO-OPTICAL RECORDING MEDIUM HAVING OXIDIZED SIDE WALL BETWEEN LAND AND GROOVE

BACKGROUND OF THE INVENTION

1. Field of the Invention

The present invention relates to an optical memory device such as an optical disk, an optical tape and an optical card for use in optical recording/reproducing apparatuses and a manufacturing method thereof.

2. Description of the Related Art

Hitherto, as a rewritable optical recording device, optical disks using a magneto-optical recording medium and a phase-change recording medium have been put into practical use. Recorded information may be erased from such an optical disk by locally raising the temperature of the optical recording medium by condensing and irradiating a light beam emitted from a semiconductor laser onto the optical recording medium. The recorded information may be then reproduced by condensing and irradiating a light beam having an intensity which will not cause erasure of the recorded information, to the optical recording medium and by discriminating the state of its reflected light. That is, the magnetizing direction is discriminated by detecting changes in the polarizing state of the reflected light in the magneto-optical recording medium and a recording mark is detected as changes in quantity of light of the reflected light in the phase-change recording medium.

In such optical disk, tracks composed of concave and convex portions called lands and groves are formed in spiral to condense and irradiate the light beam to a specific position. The track pitch is inclined to be narrowed more and more lately in order to increase the recording density of the optical disk.

The further improvement of the recording density has been discussed by realizing magnetically induced super-resolution reproduction by using a magneto-optical recording medium by electrostatically coupling a reproducing magnetic layer which is put into a perpendicular magnetizing state as temperature rises even though it is in an in-plane magnetizing state in room temperature, with a recording magnetic layer comprising a perpendicular magnetic film in Jpn. J. Appl. Phys. Vol. 35 (1996) pp. 5701–5704.

Still more, Japanese Unexamined Patent Publication JP-A 6-290496 (1994) has proposed a magneto-optical recording medium formed by laminating, one after another, a first magnetic layer whose magnetic domain wall coercivity is relatively small, a second magnetic layer whose Curie temperature is relatively low and a third magnetic layer whose domain wall coercivity is relatively large and whose Curie temperature is high, and a high density recording/reproducing method for moving domain walls existing at the boundary section of a recording mark by temperature gradient by using the magneto-optical recording medium and by detecting inversion of magnetization caused by the move of the domain walls as changes of polarizing state of reflected light. It is desirable to form the domain walls at the front boundary section and at the rear boundary section of the recording mark separately and independently in this method to stabilize the move of the domain walls and to improve the reproducing characteristic.

However, because nearly uniform magnetic film is formed in fabricating this medium by forming the: magnetic film on a substrate, domain walls are formed at the boundary edge part of a land and a groove and it has been difficult to form a magnetic film in which the front and rear domain walls are completely separated. Therefore, the front and rear domain walls have been separated by implementing a process for decomposing or eliminating the magnetic film at the track side part by annealing the both sides of the track by a high-output laser after forming the magnetic film to form a recording mark so as to straddle this processed part.

However, in the case where the track pitch is narrowed in the prior art magneto-optical disk and the prior art super-resolution magneto-optical disk, there has been a problem that thermal diffusion in the track direction becomes remarkable, thus remarkably increasing cross-write or cross-talk.

A magneto-optical disk described in JP-A 6-290496 has a problem that it requires the laser annealing process for each disk after forming the disk, thus complicating the disk manufacturing process and increasing the cost.

SUMMARY OF THE INVENTION

Hence the invention provides the following optical memory devices in order to solve the above-mentioned problems.

A first aspect of the invention provides an optical memory device comprising:

a substrate provided with a land and a groove which form an information track; and a recording magnetic layer capable of at least optically recording and reproducing information laminated on the substrate, part of the recording magnetic layer which forms side wall portions between the land and the groove being selectively oxidized.

A second aspect of the invention provides an optical memory device comprising:

a substrate provided with a land and a groove which form an information track;

a recording magnetic layer capable of at least optically recording and reproducing information laminated on the substrate, part of the recording magnetic layer which forms side wall portions between the land and the groove being selectively oxidized; and a reproducing magnetic layer capable of optically reproducing information recorded in the recording magnetic layer by transferring the information thereto.

A third aspect of the invention provides an optical memory device, comprising:

a substrate provided with a land and a groove which form an information track;

a first magnetic layer having relatively small domain wall coercivity, part of the first magnetic layer which forms side wall portions between the land and the groove being selectively oxidized;

a second magnetic layer having relatively low Curie temperature;

a third magnetic layer having relatively large domain wall coercivity and high Curie temperature, the first magnetic layer, the second magnetic layer and the third magnetic layer being laminated on the substrate in this order.

A fourth aspect of the invention provides an optical memory device capable of magneto-optically recording information or of reproducing the magneto-optically recorded information, comprising:

a substrate provided with a land and a groove both of which serve as information tracks;

at least one magnetic layer, part of the one magnetic layer which forms side wall portions between the land and the groove being selectively oxidized.

In the optical memory devices mentioned above it is preferable that an angle θ formed by the side wall with each of the land and the groove is within a range of $\theta \geq 60°$.

A fifth aspect of the invention provides a method for manufacturing the optical memory device of the fourth aspect of the invention, comprising the steps of:

forming a magnetic layer on a substrate provided with a land and a groove so as to be thick in the land and groove portions of the substrate and be thin in portions of side walls between the land and the groove;

oxidizing the magnetic layer by holding the magnetic layer in an oxygen atmosphere or oxygen plasma to form a selective oxide layer which is thin in the land and groove portions and thick in the side wall portions.

A sixth aspect of the invention provides a method for manufacturing the optical memory device of the fourth aspect of the invention, comprising the steps of:

forming a magnetic layer on a substrate provided with a land and a groove;

oxidizing the magnetic layer by holding the magnetic layer in an oxygen atmosphere or oxygen plasma;

removing the oxidized magnetic layer on the land and groove portions of the substrate by means of sputter-etching.

Because the magnetic layer on the side wall between the land and the groove is oxidized in the invention as described above, it becomes possible to suppress at least either one of cross-talk, cross-write and cross-erasure and to realize a highly dense optical memory device.

In particular, the domain wall moving type optical memory device allows the highly dense recording and reproduction by separating domain walls before and after a recording mark in the magnetic layer to move the domain walls by the oxidized side wall. It also allows the mass-productivity of the domain wall moving magneto-optical disk to be improved, thus lowing the cost.

It also allows the optical memory devices such as the domain wall moving type optical memory device to be formed without implementing the laser annealing process for each disk as described in JP-A 6-290496, thus realizing the low cost.

It becomes unnecessary to take out the disk from a sputtering apparatus to selectively oxidize during its fabrication by selectively oxidizing by using oxygen plasma after providing the selective oxide layer. It then allows the time necessary for fabricating the magneto-optical disk to be shortened and the low cost to be realized.

It is also possible to simplify the manufacturing process by removing the oxide layer other than that on the side wall part by means of etching after oxidizing the magnetic layer.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

First Embodiment

A case when the present invention is applied to a magneto-optical disk having a coherent structure will be explained below in detail by using the drawings.

Figure 1:
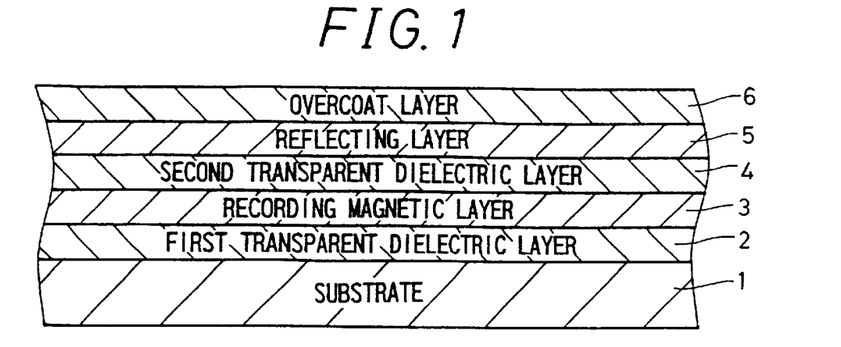
FIG. 1 is a section view showing the structure of a magneto-optical disk of a first embodiment of the invention.

FIG. 1 is a section view showing the structure of a magneto-optical disk of a first embodiment of the invention. The magneto-optical disk in FIG. 1 has the structure in which a first transparent dielectric layer 2 made of SiN, a recording magnetic layer 3 made of TbFeCo, a second transparent dielectric layer 4 made of SiN, a reflecting layer 5 made of AlTi and an overcoat layer 6 made of ultraviolet hardening resin are formed one after another on a substrate 1.

Guide grooves called lands and grooves are formed in spiral on the surface of the substrate 1 to guide a light beam to a predetermined position, and tracking of the light beam is carried out by scanning the lands and grooves by an optical system such as an optical pickup.

The first transparent dielectric layer 2 and the second transparent dielectric layer 4 made of SiN are formed by means of reactive sputtering from an Si target by using Ar and $N_2$ gases, the recording magnetic layer 3 made of TbFeCo and the reflecting layer 5 made of AlTi are formed by means of sputtering from a TbFeCo alloy target and an AlTi alloy target, respectively, by using Ar gas, and the overcoat layer 6 is formed by irradiating ultraviolet rays after applying the ultraviolet hardening resin by means of spin-coating.

In such magneto-optical disk is used the Curie temperature recording method. In the Curie temperature recording method, recording is carried out by narrowing down to irradiate the light beam emitted from a semiconductor laser to the recording magnetic layer 3 via the substrate 1 and the first transparent dielectric layer 2 and controlling the magnetizing direction of the recording magnetic layer 3 both by raising the temperature of the recording magnetic layer 3 above the Curie temperature and by applying an external magnetic field.

The same light beam is set at a power weaker than that during recording to reproduce information by a magneto-optical effect known as a polar Kerr effect in which the magnetizing direction is vertical to a light incident plane. The polar Kerr effect is a phenomenon by which the turning direction of a polarizing plane of reflected light is inverted by the direction of magnetization perpendicular to the light incident plane.

Figure 6:
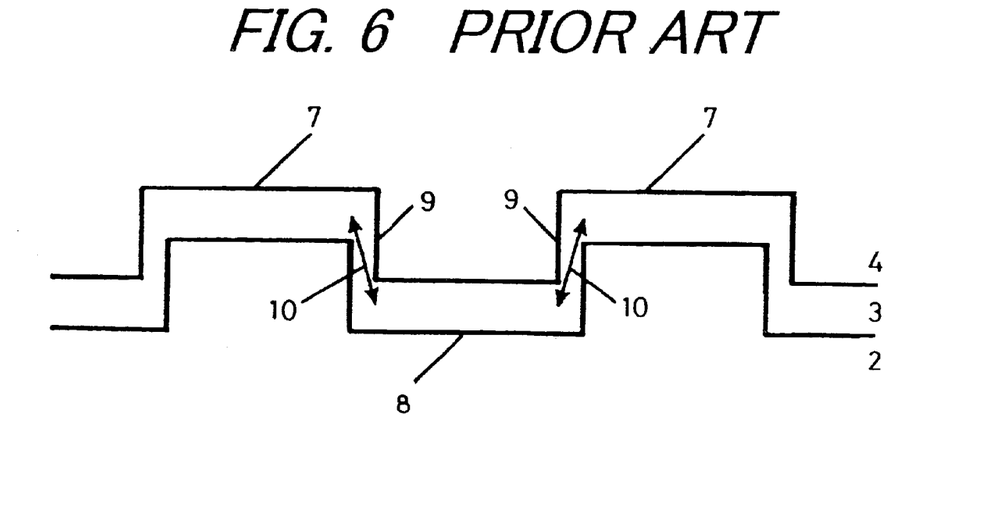
FIG. 6 is a partially enlarged section view of a prior art magneto-optical disk.

FIG. 6 is an enlarged section view of a prior art magneto-optical disk. FIG. 6 shows only the first transparent dielectric layer 2, the recording magnetic layer 3 and the second transparent dielectric layer 4 formed on the land 7 and the groove 8. The recording magnetic layer 3 is formed nearly uniformly and continuously on the substrate 1 when it is formed by means of sputtering on the substrate 1.

Because the recording magnetic layer 3 on the land 7 and the recording magnetic layer 3 on the groove 8 are continuously formed in the prior art magneto-optical disk, thermal diffusion 10 occurs readily at a side wall 9 between the land 7 and the groove 8.

Then, because the recording magnetic layer 3 on the land 7 and the recording magnetic layer on the groove 8 are magnetically continues at the side wall 9, the width of the land 7 and the groove 8 becomes narrow when the track pitch is narrowed to increase the density. Then, when a high output light beam is irradiated to a specific land 7 to record/erase, the thermal diffusion 10 readily occurs to the neighboring groove 8 and the move of domain walls from the land 7 to the groove 8 readily occurs, thus causing cross-write and cross-erasure of that recorded information existing in the neighboring groove 8 is rewritten.

Figure 2:
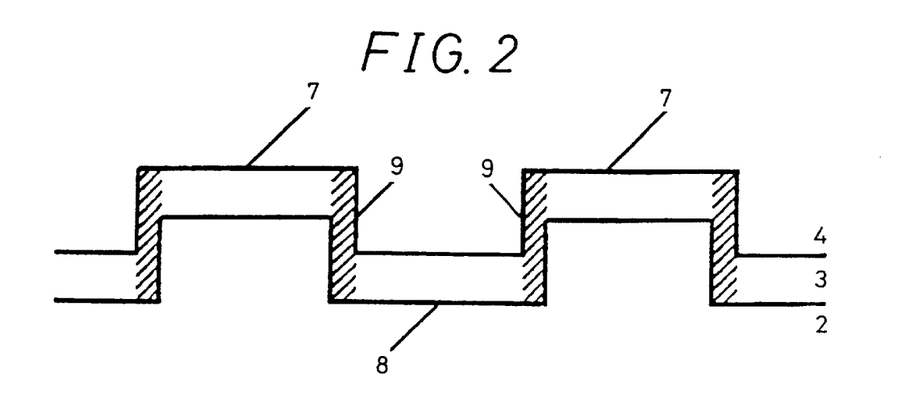
FIG. 2 is a partially enlarged section view of the magneto-optical disk according to the first embodiment of the invention.

FIG. 2 is an enlarged section view of the magneto-optical disk according to the first embodiment of the invention. In FIG. 2, the second transparent dielectric layer 4 is formed after forming the recording magnetic layer 3 and after oxidizing only the recording magnetic layer 3 formed on the side wall 9. Then, the reflecting layer 5 and the overcoat layer 6 are laminated one after another (see FIG. 1).

The method for oxidizing only the recording magnetic layer 3 formed on the side wall 9 as described above will be explained by using FIG. 3.

Figure 3:
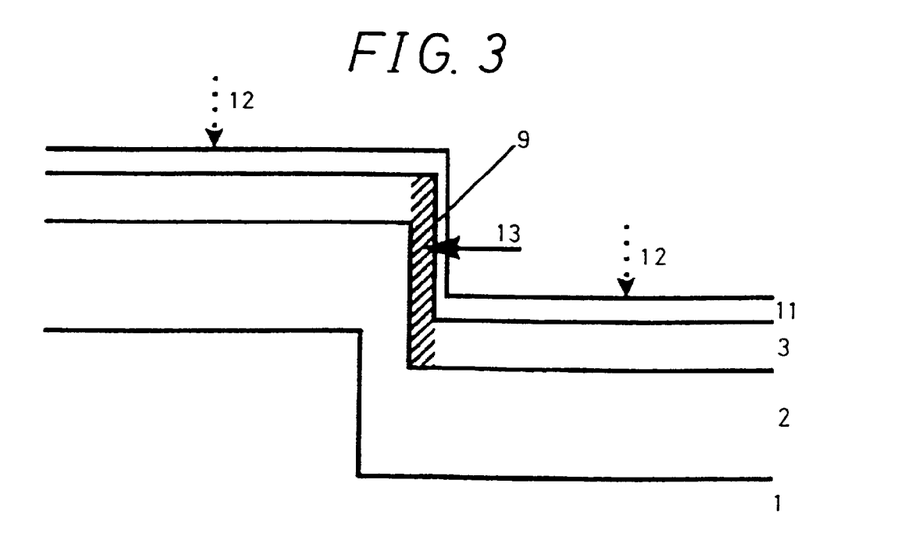
FIG. 3 is a drawing showing a method for selectively oxidizing a magnetic layer according to the invention.

In forming the thin films such as the first transparent dielectric layer 2 and the recording magnetic layer 3 on the substrate 1 by means of sputtering, although the thin films are formed nearly uniformly and continuously on the substrate 1, the thickness of the thin film formed on the side wall 9 is about a half of the thickness of the thin film formed on the land 7 and the groove 8 because the probability of deposition of the thin film is different among the land 7, the groove 8 and the side wall 9. When a very thin selective oxide layer 11 is formed by means of sputtering after forming the recording magnetic layer 3, the thickness of the selective oxidation layer 11 formed on the side wall 9 is also about a half of the thickness of the selective oxidation layer 11 formed on the land 7 and the groove 8.

When the substrate 1 is held in an atmosphere containing oxygen in this state, the selective oxidation layer 11 formed on the land 7 and the groove 8 has an enough thickness and continuity and does not transmit oxygen in the direction of an arrow 12, thus protecting nonoxidized part of the recording magnetic layer 3 from being oxidized. Meanwhile, since the selective oxidation layer 11 formed on the side wall 9 is thin and has no continuity, it transmits oxygen readily in the direction of an arrow 13. Consequently only the part of the magnetic layer 3 formed on the side wall 9 is oxidized in its entire thickness.

Then, the magneto-optical disk is completed by laminating the second transparent dielectric layer 4, the reflecting layer 5 and the overcoat layer 6 one after another, after removing the selective oxidation layer by means of sputter-etching.

The thermal conductivity at the side wall 9 drops and the magnetic characteristic thereof only at the side wall 9 is put into the in-plane magnetizing state by oxidizing the recording magnetic layer 3 formed on the side wall 9 as described above. Then, the drop of the thermal conductivity at the side wall 9 suppresses the thermal diffusion between the land 7 and the groove 8, and the change of the magnetic characteristic at the side wall 9 separates the land 7 and the groove 8 magnetically, so that no move of the domain walls from the land 7 to the groove 8 occurs, thus suppressing the cross-write and the cross-erasure.

First Embodiment

A method for forming the inventive magneto-optical disk and a concrete example of record reproducing characteristics thereof will be explained below.

(1) Method for Forming Magneto-optical Disk:

The method for forming the magneto-optical disk constructed as described above will be explained. The substrate 1 made of polycarbonate, which has guide grooves having a depth of 70 nm, which are composed of the lands 7 and grooves having a width of 0.55 $\mu$m, and is formed into the shape of a disk, is disposed within a sputtering apparatus having an Si target, a TbFeCo alloy target and an AlTi alloy target. Here, an angle $\theta$ formed by the side wall 9 with each of the land 7 and the groove 8 was 85 degrees.

Then, after vacuuming the sputtering apparatus to $1\times10^{-6}$ Torr, mixed gas of argon and nitrogen was introduced and power was supplied to the Si target to form the first transparent dielectric layer 2 made of SiN to be 80 nm in thickness on the substrate 1 under the condition of $4\times10^{-3}$ Torr of gas pressure.

Next, after vacuuming the sputtering apparatus to $1\times10^{-6}$ Torr again, argon gas was introduced and power was supplied to the TbFeCo alloy target to form the recording magnetic layer 3 made of $Tb_{0.27}(Fe_{0.85}Co_{0.15})_{0.73}$ to be 20 nm in thickness on the first transparent dielectric layer 2 under the condition of $4\times10^{-3}$ Torr of gas pressure. The recording magnetic layer 3 is a perpendicular magnetic film whose compensating temperature is 80° C. and whose Curie temperature is 260° C.

Next, power was supplied to the Si target while introducing the argon gas, to form the selective oxidation layer 11 made of Si to be 4 nm in thickness on the recording magnetic layer 3 on the land 7 and the groove 8 under the condition of $4\times10^{-3}$ Torr of gas pressure.

Then, the recording magnetic layer 3 formed on the side wall 9 was selectively oxidized by taking out the substrate 1 on which the first transparent dielectric layer 2, the recording magnetic layer 3 and the selective oxidation layer 11 had been formed, from the sputtering apparatus and by holding it in an atmosphere of 25° C. of temperature and 30% of humidity for 24 hours.

Next, the substrate 1 on which the selective oxidation had been implemented was disposed within the sputtering apparatus and the selective oxidation layer 11 was removed by means of sputter-etching by introducing argon gas after vacuuming the sputtering apparatus to $1\times10^{-6}$ Torr under the conditions of 0.2 W/cm² of charged high-frequency power and $1\times10^{-6}$ Torr of gas pressure.

Then, mixed gas of argon and nitrogen was introduced and power was supplied to the Si target to form the second transparent dielectric layer 4 made of SiN to be 20 nm in thickness on the recording magnetic layer 3 which had been exposed by the sputter-etching under the condition of $4\times10^{-3}$ Torr of gas pressure. Then, after vacuuming the sputtering apparatus to $1\times10^{-6}$ Torr again, argon gas was introduced and power was supplied to the AlTi alloy target to form the reflecting layer 5 made of $Al_{0.90}Ti_{0.10}$ to be 50 nm in thickness on the second transparent dielectric layer 4 under the condition of $4\times10^{-3}$ Torr of gas pressure.

Then, the magneto-optical disk was fabricated by forming the overcoat layer 6 by irradiating ultraviolet rays to harden an ultraviolet hardening resin film after applying the resin by means of spin coating.

The first transparent dielectric layer 2 and the second transparent dielectric layer 4 are not limited to be SiN and a transparent dielectric such as AlN, AlSiN and $Ta_2O_3$ may be used in the magneto-optical disk described above. Its thickness must be set so as to realize a good interference effect with respect to an incident light beam 4 and to increase a polar Kerr rotary angle of a medium. For instance, in the case where the wavelength of the light beam 4 is 680 nm, the thickness of the first transparent dielectric layer 2 may be set around 60 to 100 nm and the thickness of the second transparent dielectric layer 4 may be set around 10 to 30 nm.

The recording magnetic layer 3 is not also limited to be TbFeCo and it is possible to adopt a perpendicular magnetic film made of a material such as TbFe, DyFe, DyFeCo, TbDyFe, TbDyFeCo, TbFeD, TbFeCoD, DyFeD, DyFeCoD, TbDyFeD and TbDyFeCoD (D is an element or a plurality of elements selected among Y, Ti, V, Cr, Pd, Cu, Si and Al).

The selective oxidation layer 11 is also not limited to be Si and it is possible to adopt a metal such as Al, Ti and Ta or their nitride. It is desirable to form the selective oxidation layer 11 to be 3 nm to 8 nm in thickness on the land 7 and the groove 8. When the thickness is thinner than 3 nm, oxidation of the recording magnetic layer 3 advances on the land 7 and the groove 8. When the thickness is thicker than 8 nm, it becomes difficult to oxidize the recording magnetic layer 3 on the side wall 9.

The condition of the sputter-etching is not also limited to be $0.2$ W/cm$^2$ of high-frequency power and $1\times10^{-2}$ Torr of gas pressure. The high-frequency power is desirable to be 0.05 to 0.5 W/cm$^2$ and the gas pressure to be $1\times10^{-3}$ to $5\times10^{-2}$ Torr. It is unrealistic to use the power smaller than 0.05 W/cm$^2$ because etching rate becomes extremely slow in the sputter-etching and a processing time is prolonged. When power greater than 0.5 W/cm$^2$ is charged, the substrate made of polycarbonate deforms as the substrate temperature rises. It has been difficult to maintain stable discharge when the gas pressure is lower than $1\times10^{-3}$ Torr and higher than $5\times10^{-2}$ Torr.

The reflecting layer 5 is not also limited to be AlTi and Al and an Al alloy such as AlSi and AlNi may be used.

(2) Record Reproducing Characteristics:

The result of evaluation of the magneto-optical disk described above implemented by means of a magneto-optical pickup using a semiconductor laser of 680 nm of wavelength under the condition of 2.5 m/s of linear speed will be explained below.

After forming a repetitive pattern of upward magnetization and downward magnetization corresponding to the direction of a recording magnetic field in the recording magnetic layer 3 by tracking a light beam to scan a specific land 7 and by applying the recording magnetic field of 15 kA/m of intensity modulated by frequency of 2 MHz while continuously irradiating a record reproducing laser at 6 mW, the record reproducing laser was set at 1 mW to measure a signal to noise ratio (CNR1) of the reproduced signal. As a result, CNR of 48.5 dB was obtained.

Next, after uniforming the magnetizing direction of the neighboring groove 8 in one direction by tracking a light beam to scan the neighboring groove 8 and by applying a magnetic field of fixed intensity of +15 kA/m while continuously irradiating the record reproducing laser at 6 mW, the record reproducing laser was set at 1 mW and the light beam was returned to the land 7 where the recording was made to measure a signal to noise ratio (CNR2) of the reproducing signal again. As a result, CNR of 41.0 dB was obtained. Here, it is possible to estimate the quantity of cross-erasure by calculating the difference ΔCNR between CNR1 and CNR2.

When ΔCNR of the magneto-optical disk of the invention described in the method for forming the magneto-optical disk of the first embodiment was compared with the prior art magneto-optical disk (first comparative example) in which no selective oxidation was implemented in the method for forming the magneto-optical disk of the first embodiment, CNR1 was 48.5 dB, CNR2 was 36.0 dB and ΔCNR was 12.5 dB and a significant cross-erasure occurred by erasing the neighboring groove 8, thus remarkably dropping the CNR of the land 7, in the prior art magneto-optical disk of the first comparative example, while CNR1 was 48.5 dB, CNR2 was 41.0 dB and ΔCNR was 7.5 dB in the magneto-optical disk of the invention of the first embodiment and it was confirmed that the cross-erasure may be effectively suppressed.

Second Embodiment

It is necessary to selectively oxidize only the recording magnetic layer on the side wall 9 and to control the thickness of the selective oxidation layer 11 so that oxygen transmits through the selective oxidation layer 11 formed on the side wall 9 and so that no oxygen transmits through the selective oxidation layer 11 formed on the land 7 and the groove 8 in the invention. The difference of the thicknesses changes depending on the angle θ formed by the side wall 9 with each of the land 7 and the groove 8. Then, the magneto-optical disks of the invention were fabricated by using the substrate whose angle θ is changed variously. Table 1 shows the result obtained by measuring CNR1 and ΔCNR in the respective disks.

TABLE 1

| θ (degree) | CNR1 (dB) | ΔCNR (dB) |
| --- | --- | --- |
| 50 | 48.0 | 12.5 |
| 60 | 48.5 | 9.0 |
| 75 | 48.0 | 8.5 |
| 85 | 48.5 | 7.5 |

While ΔCNR of the first comparative example is 12.5 dB, ΔCNR which is smaller than 12.5 dB could be obtained when the angle θ is 60 degrees or more. Accordingly, the angle θ formed by the side wall 9 with each of the land 7 and the groove 8 must be 60 degrees or more. ΔCNR increased when θ was 50 degrees, possibly because the thickness of the selective oxidation layer 11 formed on the side wall 9 was thickened and the recording magnetic layer 3 on the side wall 9 was not oxidized. It is desirable to thin the selective oxidation layer 11 formed on the side wall 9 as much as possible so as to readily transmit oxygen and θ to be close to 90 degrees as much as possible in order to oxidize only the recording magnetic layer 3 on the side wall 9.

Third Embodiment

Although the recording magnetic layer 3 formed on the side wall 9 was selectively oxidized after forming the selective oxidation layer 11 made of Si into 4 nm thick on the recording magnetic layer 3 by holding it in the atmosphere of 25° C. of temperature and 30% of humidity for 24 hours, the holding time may be shortened by changing the holding temperature.

Table 2 shows the result obtained by measuring CNR1 and ΔCNR of a magneto-optical disk fabricated by forming the first transparent dielectric layer 2, the recording magnetic layer 3 and the selective oxidation layer 11 in the same manner with the first embodiment, by implementing the selective oxidation by holding the humidity at 30% and by changing the holding temperature and time, and then by forming the second transparent dielectric layer 4, the reflecting layer 5 and the overcoat layer 6 by implementing sputter-etching in the same manner with the first embodiment.

TABLE 2

| Holding Temperature (° C.) | Holding Time (min.) | CNR1 (dB) | ΔCNR (dB) |
|---|---|---|---|
| 50 | 180 | 48.5 | 8.5 |
| 75 | 45 | 48.5 | 8.0 |
| 100 | 5 | 48.5 | 12.5 |
| 100 | 10 | 48.5 | 9.5 |
| 100 | 15 | 48.0 | 8.0 |
| 100 | 20 | 48.0 | 8.0 |
| 100 | 30 | 44.0 | 6.5 |
| 100 | 60 | 38.0 | 5.0 |
| 125 | 5 | 48.0 | 8.0 |

As it is apparent from Table 2, the oxidation of the recording magnetic layer 3 on the side wall 9 is accelerated and the holding time may be shortened by raising the holding temperature. When the holding temperature was 100° C. and the holding time was 5 minutes, ΔCNR was as large as 12.5 dB and the same cross-erasure with the prior art magneto-optical disk occurred because the oxidation of the recording magnetic layer 3 on the side wall 9 was insufficient, which ΔCNR dropped and the same degree of cross-erasure with the first embodiment could be realized by prolonging the holding time from 10 to 20 minutes. However, it was confirmed that when the holding time was prolonged further from 30 to 60 minutes, the initial signal quality (CNR1) dropped because the recording magnetic layer 3 on the land 7 or the groove 8 was also oxidized. CNR could not be measured when the holding temperature was set at 150° C. because the substrate, i.e., polycarbonate, was deformed.

As described above, it is possible to selectively oxidize only the recording magnetic layer 3 on the side wall 9 without oxidizing the recording magnetic layer 3 on the land 7 and the groove 8 in the selective oxidation of the invention by adjusting the holding time while setting the holding temperature at 125° C. or less.

Fourth Embodiment

While the recording magnetic layer 3 formed on the side wall 9 has been selectively oxidized after forming the selective oxidation layer 11 made of Si into 4 nm thick on the recording magnetic layer 3, by holding it in the atmosphere of 25° C. of temperature and 30% of humidity for 24 hours in the first embodiment, the recording magnetic layer 3 formed on the side wall 9 is selectively oxidized after forming the selective oxidation layer 11 made of Si by exposing it in oxygen plasma in the present embodiment.

That is, the recording magnetic layer 3 was selectively oxidized by forming the first transparent dielectric layer 2, the recording magnetic layer 3 and the selective oxidation layer 11 in the same manner with the first embodiment, by introducing oxygen gas into the sputtering apparatus after vacuuming the sputtering apparatus to $1 \times 10^{-6}$ Torr, by charging high-frequency power of 0.05 W/cm$^2$ to the electrode side where the substrate 1 is disposed under the condition of $1 \times 10^{-2}$ Torr of gas pressure and by exposing the selective oxidation layer 11 to the oxygen plasma for two minutes.

Then, the magneto-optical disk was fabricated by removing the selective oxidation layer 11 by sputter-etching and by forming the second transparent dielectric layer 4, the reflecting layer 5 and the overcoat layer 6 in the same manner with the first embodiment. As a result of measurement of CNR1 and ΔCNR of the magneto-optical disk, CNR1 was 48.0 dB and ΔCNR was 8.0 dB. Thus, it was confirmed that cross-erasure is effectively suppressed in the same manner with the first embodiment.

The present embodiment allows the recording magnetic layer 3 on the side wall 9 to be selectively oxidized in a shorter time, because it allows the magneto-optical disk to be formed without taking the substrate 1 out of the sputtering apparatus after forming the selective oxidation layer 11 and the selective oxidation is carried out by the activated oxygen plasma.

Although the selective oxidation has been carried out under the condition of 0.05 W/cm$^2$ of charged high-frequency power and $1 \times 10^{-2}$ Torr of gas pressure in the present embodiment, the condition is not limited only to that. The high-frequency power is desirable to be 0.01 to 0.20 W/cm$^2$ and the gas pressure to be $1 \times 10^{-3}$ to $5 \times 10^{-2}$ Torr. It is unrealistic to use the power smaller than 0.01 W/cm$^2$, because oxidation rate becomes extremely slow and processing time is prolonged. When the power greater than 0.20 W/cm$^2$ is charged, the sputter-etching of the selective oxidation layer 11 advances and it becomes difficult to oxidize only the recording magnetic layer 3 on the side wall 9. It has been difficult to maintain stable discharge when the gas pressure is lower than $1 \times 10^{-3}$ Torr and higher than $5 \times 10^{-2}$ Torr.

Second Embodiment

A case when the invention is applied to a super-resolution magneto-optical disk in which at least a reproducing magnetic layer and a recording magnetic layer are magnetostatically combined will be explained below in detail by using the drawings.

Figure 4:
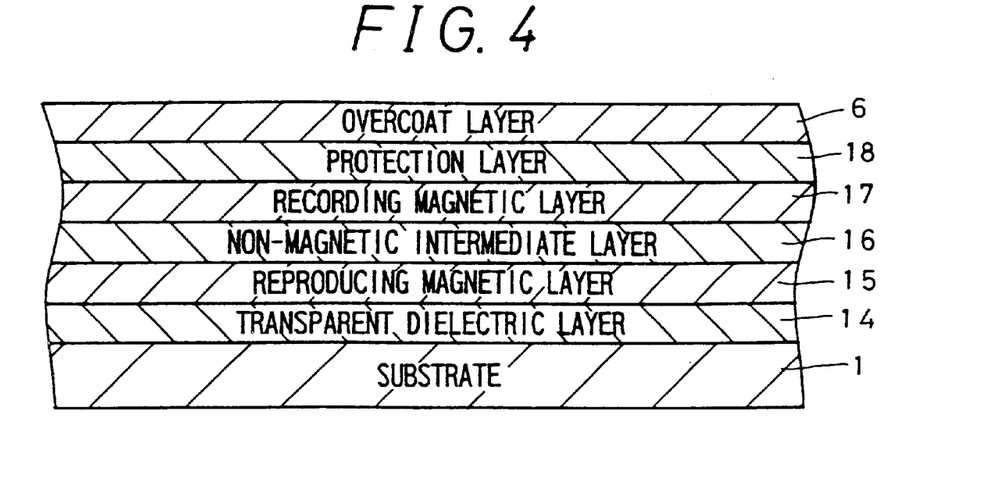
FIG. 4 is a section view showing the structure of a magneto-optical disk according to a second embodiment of the invention.

FIG. 4 is a section view showing the structure of a magneto-optical disk according to the second embodiment of the invention. The magneto-optical disk in FIG. 4 has the structure in which a transparent dielectric layer 14 made of SiN, a reproducing magnetic layer 15 made of GdFeCo which is in an in-plane magnetizing state in room temperature and which is put into a perpendicular magnetizing state as temperature rises, a non-magnetic intermediate layer 16 made of SiN, a recording magnetic layer 17 made of TbFeCo, a protection layer 18 made of SiN and an overcoat layer 6 made of ultraviolet hardening resin are formed one by one on the substrate 1.

In such magneto-optical disk is used the Curie temperature recording method and recording is carried out by stopping a light beam emitted from a semiconductor laser to the reproducing magnetic layer 15 and the recording magnetic layer 17 via the substrate 1 and the transparent dielectric layer 14 and by controlling the magnetizing direction of the recording magnetic layer 17 by raising the temperature of the recording magnetic layer 17 above the Curie temperature and by applying an external magnetic field.

The same light beam at the power weaker than that during the recording to reproduce information by a magneto-optical effect known as a polar Kerr effect. The polar Kerr effect is a phenomenon by which the turning direction of a polarizing plane of a reflected light is inverted by the direction of magnetization perpendicular to the light incident plane. While the reproducing magnetic layer 15 is arranged so as to assume the in-plane magnetizing state in room temperature and to assume the perpendicular magnetizing state as temperature rises as described above, the super-resolution reproduction is realized by reproducing information of only a region where the temperature has risen as a reproducing light beam is irradiated, by transferring it from the recording magnetic layer 17 to the reproducing magnetic layer 15.

While the first embodiment has suppressed the cross-write and cross-erasure from occurring by selectively oxidizing only the recording magnetic layer 3 on the side wall 9, the second embodiment suppresses the cross-talk, cross-write and cross-erasure from occurring by selectively oxidizing at least either the reproducing magnetic layer 15 or the recording magnetic layer 17.

Fifth Embodiment

A method for forming the magneto-optical disk of the invention and a concrete example of the record reproducing characteristics thereof will be explained below.

(1) Method for Forming Magneto-Optical Disk:

The method for forming the magneto-optical disk constructed as described above will be explained.

The substrate 1 made of polycarbonate, which has guide grooves having a depth of 70 nm, which are composed of the lands 7 and grooves 8 having a width of 0.45 μm, and is formed into the shape of a disk, is disposed within a sputtering apparatus having an Si target, a GdFeCo alloy target and a TbFeCo alloy target. Here, an angle θ formed by the side wall 9 with each of the land 7 and the groove 8 was 85 degrees.

Then, after vacuuming the sputtering apparatus to $1\times10^{-6}$ Torr, mixed gas of argon and nitrogen was introduced and power was supplied to the Si target to form the transparent dielectric layer 14 made of SiN to be 80 nm in thickness on the substrate 1 under the condition of $4\times10^{-3}$ Torr of gas pressure.

Next, after vacuuming the sputtering apparatus to $1\times10^{-6}$ Torr again, argon gas was introduced and power was supplied to the GdFeCo alloy target to form the reproducing magnetic layer 15 made of $Gd_{0.31}(Fe_{0.80}Co_{0.20})_{0.69}$ to be 30 nm in thickness on the transparent dielectric layer 14 under the condition of $4\times10^{-3}$ Torr of gas pressure. The reproducing magnetic layer 15 has a characteristic that it is put into the in-plane magnetizing state in room temperature and is put into the perpendicular magnetizing state as temperature rises. Its Curie temperature was 320° C.

Next, power was supplied to the Si target while introducing the argon gas to form the selective oxidation layer 11 made of Si to be 4 nm in thickness on the reproducing magnetic layer 15 on the land 7 and the groove 8 under the condition of $4\times10^{-3}$ Torr of gas pressure.

Then, after vacuuming the sputtering apparatus to $1\times10^{-6}$ Torr, the reproducing magnetic layer 15 was selectively oxidized by introducing oxygen gas to the sputtering apparatus, by charging high-frequency power of 0.05 W/cm² to the electrode side where the substrate 1 is disposed and by exposing the selective oxide layer 11 to the oxygen plasma for two minutes.

Next, after vacuuming the sputtering apparatus to $1\times10^{-6}$ Torr, the selective oxidation layer 11 was removed by sputter-etching by introducing argon gas under the conditions of 0.2 W/cm² of charged high-frequency power and $1\times10^{-2}$ Torr of gas pressure.

Then, mixed gas of argon and nitrogen was introduced and power was supplied to the Si target to form the non-magnetic intermediate layer 16 made of SiN to be 20 nm in thickness on the reproducing magnetic layer 15 under the condition of $4\times10^{-3}$ Torr of gas pressure.

Then, after vacuuming the sputtering apparatus to $1\times10^{-6}$ Torr again, argon gas was introduced and power was supplied to the TbFeCo alloy target to form the recording magnetic layer 17 made of $Tb_{0.24}(Fe_{0.85}Co_{0.15})_{0.76}$ to be 40 nm in thickness on the non-magnetic intermediate layer 16 under the condition of $4\times10^{-3}$ Torr of gas pressure. The recording magnetic layer 17 was a perpendicular magnetic film whose compensating temperature is 25° C. and whose Curie temperature is 280° C.

Then, mixed gas of argon and nitrogen was introduced and power was supplied to the Si target to form the protection layer 18 made of SiN to be 20 nm in thickness on the recording magnetic layer 17 under the condition of $4\times10^{-3}$ Torr of gas pressure.

Then, the magneto-optical disk was fabricated by forming the overcoat layer 6 by irradiating ultraviolet rays to harden an ultraviolet hardening resin film after applying the resin by means of spin coating.

(2) Record Reproducing Characteristics:

The result of evaluation of the magneto-optical disk described above implemented by means of a magneto-optical pickup using a semiconductor laser of 680 nm of wavelength under the condition of 2.5 m/s of linear speed will be explained below.

It is possible to estimate a quantity of cross-talk after forming a repetitive pattern of upward magnetization and downward magnetization corresponding to the direction of a recording magnetic field in the recording magnetic layer 17, by tracking a light beam to scan a specific land 7 and by applying the recording magnetic field of ±15 kA/m of intensity modulated by frequency of 2 MHz while continuously irradiating a record reproducing laser at 5.5 mW, by tracking the light beam to scan the neighboring groove 8 by setting the record reproducing laser at 2 mW and by measuring a quantity of signal (CT) leaking from the land 7.

When CT of the super-resolution magneto-optical disk of the invention described in the method for forming the magneto-optical disk of the fifth embodiment was compared with that of the prior art super-resolution magneto-optical disk in which the reproducing magnetic layer 15 was not selectively oxidized in the method for forming the super-resolution magneto-optical disk of the fifth embodiment, 12.5 dB of CT existed in the prior art super-resolution magneto-optical disk, while CT of the super-resolution magneto-optical disk of the fifth embodiment was 6.5 dB, and it was confirmed that the cross-talk may be considerably reduced by selectively oxidizing the reproducing magnetic layer 15.

The considerable reduction of the cross-talk is considered to happen, because the thermal diffusion from the land 7 to the groove 8 is suppressed because the thermal conductivity of the reproducing magnetic layer 15 on the side wall 9 drops by selectively oxidizing only the reproducing magnetic layer 15 on the side wall 9 in the same manner with the first embodiment in which the recording magnetic layer 3 on the side wall 9 is selectively oxidized, and because the magnetic coupling of the land 7 with the groove 8 is shut off at the side wall 9 because the in-plane magnetic anisotropy of the reproducing magnetic layer 15 on the side wall 9 has increased.

Although the selective oxidation using the oxygen plasma has been described in the fifth embodiment, the reproducing magnetic layer 15 may be selectively oxidized by holding in the oxygen atmosphere similarly to the first and third embodiments. Still more, the angle θ formed by the side wall 9 with each of the land 7 and the groove 8 is desirable to be 60 degrees or more similarly to the second embodiment.

Still more, although the fifth embodiment shows that the cross-talk may be suppressed by selectively oxidizing the reproducing magnetic layer 15, it is also possible to suppress cross-write and cross-erasure by selectively oxidizing the recording magnetic layer 17 as well.

Third Embodiment

A case when the invention is applied to a domain wall moving magneto-optical disk described in JP-A 6-290496 will be explained below in detail by using the drawings.

Figure 5:
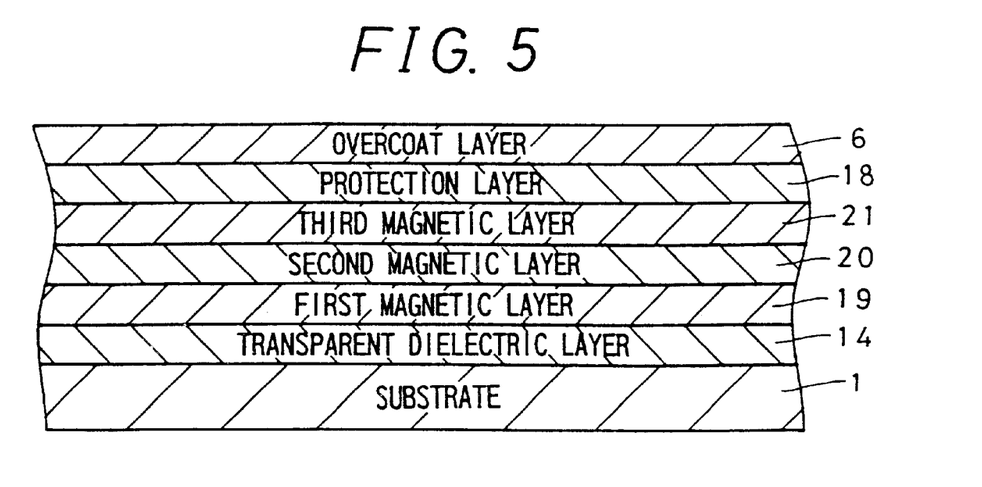
FIG. 5 is a section view showing the structure of a magneto-optical disk according to a third embodiment of the invention.

FIG. 5 is a section view of a magneto-optical disk according to a third embodiment of the invention. The magneto-optical disk in FIG. 5 has the structure in which the transparent dielectric layer 14 made of SiN, the first magnetic layer 19 whose domain wall magneto-resistive force is relatively small, a second magnetic layer 20 whose Curie temperature is relatively low, a third magnetic layer 21 whose domain wall coercivity is relatively large and Curie temperature is relatively high, the protection layer 18 made of SiN and the overcoat layer 6 made of ultraviolet hardening resin are formed one by one on the substrate 1.

In such magneto-optical disk is used the Curie temperature recording method and recording is carried out by stopping a light beam emitted from a semiconductor laser to the first magnetic layer 19, the second magnetic layer 20 and the third magnetic layer 21 via the substrate 1 and the transparent dielectric layer 14, and by controlling the magnetizing direction of the third magnetic layer 21 by raising the temperature of the third magnetic layer 21 above the Curie temperature and by applying an external magnetic field.

The same light beam at a power weaker than that during the recording to reproduce information by a magneto-optical effect known as a polar Kerr effect. The polar Kerr effect is a phenomenon by which the direction of turn of a polarizing plane of a reflected light is inverted by the direction of magnetization perpendicular to the light incident plane.

While high density record reproduction may be realized in such magneto-optical recording medium by moving domain walls existing at the boundary section of a recording mark by temperature gradient and by detecting inversion of magnetization caused by such move of domain walls as a change of polarizing state of reflected light, the domain walls at the front boundary section and those at the rear boundary section of the recording mark must be separately and independently formed in order to move the domain walls. Then, the front and rear domain walls have been separated by implementing a process for decomposing or eliminating a magnetic film on the side of a track by annealing both sides of the track by a high output laser after forming the magnetic film to form the recording mark so as to straddle the processed part.

The invention realizes the high density record reproduction by separating the domain walls before and after the recording mark in the first magnetic layer 19 to move the domain walls by selectively oxidizing only the first magnetic layer 19 on the side wall 9 after forming the first magnetic layer 19.

Sixth Embodiment

A method for forming the inventive magneto-optical disk and a concrete example of the record reproducing characteristics thereof will be explained below.

(1) Method for Forming Magneto-Optical Disk:

The method for forming the magneto-optical disk constructed as described above will be explained. The substrate 1 made of polycarbonate, which has guide grooves having a depth of 70 nm, which are composed of the lands 7 and grooves 8 having a width of 0.45 μm, and is formed into the shape of a disk, is disposed within a sputtering apparatus having an Si target, a GdFeSi alloy, a TbFe alloy and a TbFeCo alloy target. Here, an angle θ formed by the side wall 9 with each of the land 7 and the groove 8 was 85 degrees.

Then, after vacuuming the sputtering apparatus to $1 \times 10^{-6}$ Torr, mixed gas of argon and nitrogen was introduced and power was supplied to the Si target to form the transparent dielectric layer 14 made of SiN to be 80 nm in thickness on the substrate 1 under the condition of $4 \times 10^{-3}$ Torr of gas pressure.

Next, after vacuuming the sputtering apparatus to $1 \times 10^{-6}$ Torr again, argon gas was introduced and power was supplied to the GdFeSi alloy target to form the first magnetic layer 19 made of $(Gd_{0.27}Fe_{0.73})_{0.35}Si_{0.15}$ to be 30 nm in thickness on the transparent dielectric layer 14 under the condition of $4 \times 10^{-3}$ Torr of gas pressure. The first magnetic layer 19 is a perpendicular magnetizing film whose compensating temperature is 140° C. and whose Curie temperature is 180° C.

Next, power was supplied to the Si target while introducing the argon gas to form the selective oxidation layer 11 made of Si to be 4 nm in thickness on the first magnetic layer 19 on the land 7 and the groove 8 under the condition of $4 \times 10^{-3}$ Torr of gas pressure.

Then, after vacuuming the sputtering apparatus to $1 \times 10^{-6}$ Torr, the first magnetic layer 19 was selectively oxidized by introducing oxygen gas to the sputtering apparatus, by charging high-frequency power of 0.05 W/cm² to the electrode side where the substrate 1 is disposed and by exposing the selective oxide layer 11 to the oxygen plasma for two minutes under the condition of $1 \times 10^{-2}$ Torr of gas pressure.

Next, after vacuuming the sputtering apparatus to $1 \times 10^{-6}$ Torr, the selective oxidation layer 11 was removed by sputter-etching by introducing argon gas under the conditions of 0.2 W/cm² of charged high-frequency power and $1 \times 10^{-2}$ Torr of gas pressure.

Next, power was supplied to the TbFe alloy target while introducing the argon gas to form the second magnetic layer 20 made of $Tb_{0.25}Fe_{0.75}$ to be 20 nm in thickness on the first magnetic layer 19 under the condition of $4 \times 10^{-3}$ Torr of gas pressure. The second magnetic layer 20 is a perpendicular magnetizing film whose compensating temperature is 25° C. and whose Curie temperature is 140° C.

Next, power was supplied to the TbFeCo alloy target while introducing the argon gas to form the third magnetic layer 21 made of $Tb_{0.27}(Fe_{0.85}Co_{0.15})_{0.73}$ to be 20 nm in thickness on the second magnetic layer 20 under the condition of $4 \times 10^{-3}$ Torr of gas pressure. The third magnetic layer 21 is a perpendicular magnetizing film whose compensating temperature is 80° C. and whose Curie temperature is 260° C.

Then, mixed gas of argon and nitrogen was introduced and power was supplied to the Si target to form the protection layer 18 made of SiN to be 20 nm in thickness on the third magnetic layer 21 under the condition of $4 \times 10^{-3}$ Torr of gas pressure.

Then, the magneto-optical disk was fabricated by forming the overcoat layer 6 by irradiating ultraviolet rays to harden an ultraviolet hardening resin film after applying the resin by means of spin coating.

(2) Record Reproducing Characteristics:

The result of evaluation of the magneto-optical disk described above implemented by means of a magneto-optical pickup using a semiconductor laser of 680 nm of wavelength under the condition of 2.5 m/s of linear speed will be explained below.

The signal to noise ratio (CNR) of a reproduced signal was measured by forming a repetitive pattern of upward magnetization and downward magnetization corresponding to the direction of a recording magnetic field in the third magnetic layer 21 by tracking a light beam to scan a specific land 7 and by applying the recording magnetic field of ±15 kA/m of intensity modulated by frequency of 5 MHz while continuously irradiating a record reproducing laser at 7 mW and then by setting the record reproducing laser at 2.4 mW. As a result, it was confirmed that 42 dB of CNR was obtained and a rectangular reproducing waveform caused by the move of domain walls was obtained.

Meanwhile, when the record was reproduced in the same manner with a magneto-optical disk formed without selectively oxidizing the first magnetic layer 19, no rectangular reproducing waveform caused by the move of domain walls was seen and CNR of only about 22 dB was obtained.

Thus, it becomes possible to realize the high density record reproduction, to improve the mass-productivity of the domain wall moving magneto-optical disks and to realize the low cost, by separating the domain walls before and after the recording mark in the first magnetic layer 19 and by moving the domain walls by oxidizing only the first magnetic layer 19 on the side wall 9 by selectively oxidizing the first magnetic layer 19 instead of implementing the process of decomposing or eliminating the magnetic film on the sides of a track by annealing both sides of the track by high output laser after forming the magnetic film.

Although only the selective oxidation of only the first magnetic layer 19 necessary for the reproducing operation has been described here, it is possible to reduce cross-write and cross-erasure by selectively oxidizing the second magnetic layer 20 and the third magnetic layer 21 after forming the second magnetic layer 20 and the third magnetic layer 21 as described in the first and second modes of embodiment.

Further, although the selective oxidation using the oxygen plasma has been described in the sixth embodiment, the first magnetic layer 19 may be selectively oxidized by holding within the oxygen atmosphere in the same manner with the first and third embodiments. Further, the angle θ formed by the side wall 9 with each of the land 7 and the groove 8 is desirable to be 60degrees or more similarly to the second embodiment.

Fourth Embodiment

Figure 7:
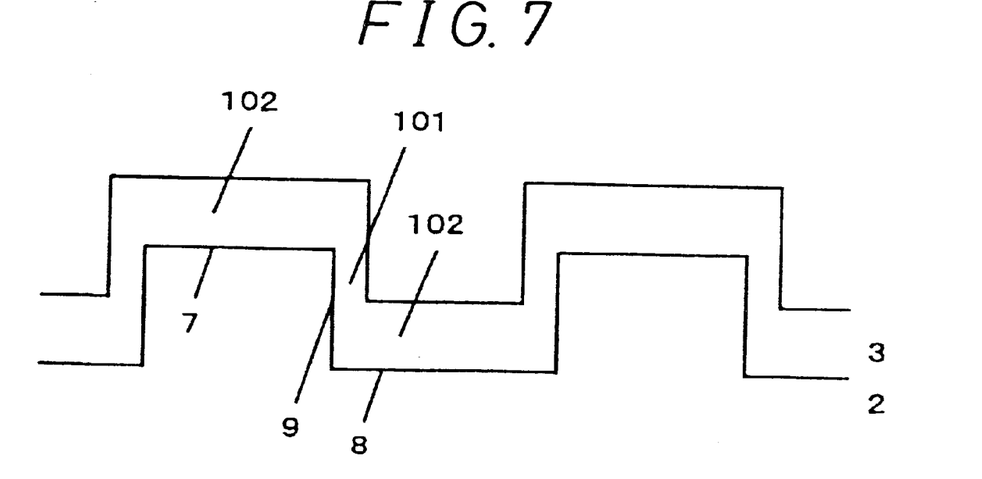
FIG. 7 is a section view for explaining a method for manufacturing the magneto-optical disk according to a fourth embodiment of the invention.
Figure 8:
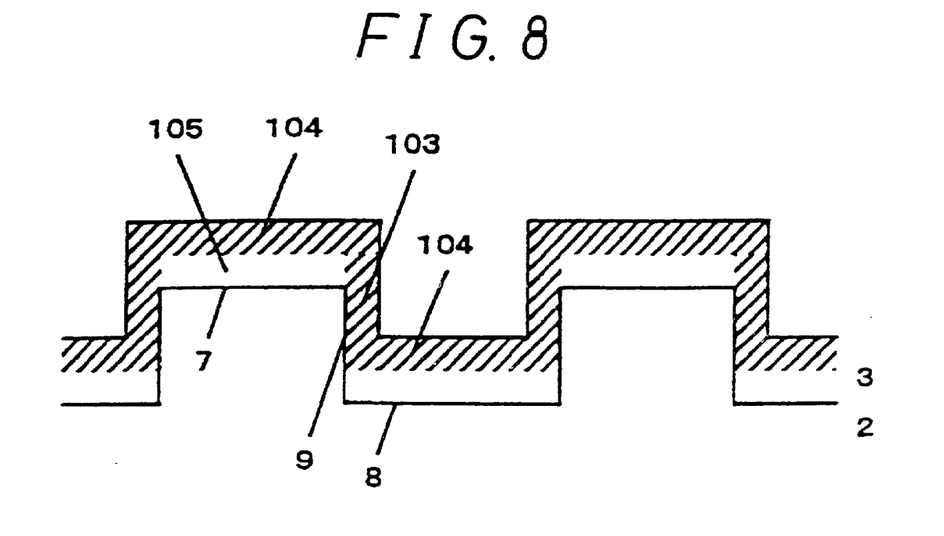
FIG. 8 is a section view for explaining a state in which oxidation is implemented in the method for manufacturing the magneto-optical disk in the fourth embodiment of the invention.
Figure 9:
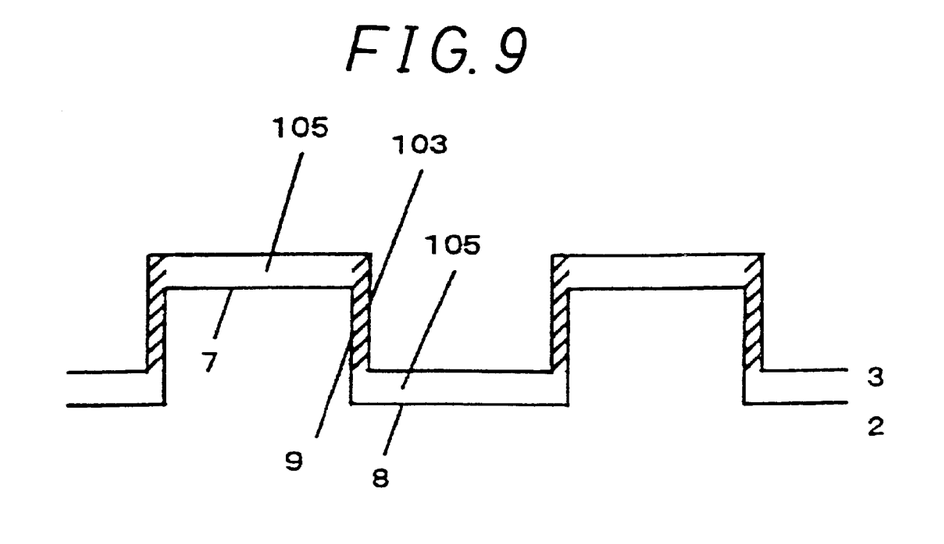
FIG. 9 is a section view for explaining a state in which sputter-etching is implemented in the method for manufacturing the magneto-optical disk in the fourth embodiment of the invention.

Another method for oxidizing only the recording magnetic layer 3 formed on the side wall will be explained in the present embodiment. FIGS. 7 through 9 are drawings explaining the other method for oxidizing only the recording magnetic layer 3 formed on the side wall 9.

In forming the magnetic thin films such as the first transparent dielectric layer 2 and the recording magnetic layer 3 on the substrate 1 by sputtering, although the thin films are formed nearly uniformly and continuously on the substrate 1, the thickness of the thin film 101 formed on the side wall 9 is about a half of the thickness of the thin film 102 formed on the land 7 and the groove 8 as shown in FIG. 7 because the probability of deposition of the thin film is different among the land 7, the groove 8 and the side wall 9.

When the thin films are held in an atmosphere containing oxygen in this state, the oxidation of the recording magnetic layer 3 advances uniformly from the surface of the recording magnetic layer 3 as shown in FIG. 8. Therefore, the thin film 101 on the side wall 9 is completely oxidized, thus forming an oxide magnetic layer 103 and the thin film 102 on the land 7 and the groove 8 is oxidized only by its surface, thus forming a surface oxide magnetic layer 104.

Next, sputter-etching is carried out to remove the surface oxide magnetic layer 104 on the thin film 102 on the land 7 and the groove 8. Then, a recording magnetic layer 105 is formed on the land 7 and the groove 8, and the oxide magnetic layer 103 is formed on the part of the side wall 9 as shown in FIG. 9. The oxide magnetic layer 103 at the side wall 9 is also slightly sputter-etched here. However, because an angle θ of the side wall 9 is large (e.g., 85 degrees), and the probability of collision of sputtering particles is low, the oxide magnetic layer 103 formed at the part of the side wall 9 is barely sputter-etched.

After that, the magneto-optical disk is completed by laminating the second transparent dielectric layer 4, the reflecting layer 5 and the overcoat layer 6 one after another.

The thermal conductivity at the side wall 9 drops and the magnetic characteristic of the side wall 9 changes as the recording magnetic layer 3 formed on the side wall 9 turns out to be the oxide magnetic layer 103. The drop of the thermal conductivity at the side wall 9 suppresses the thermal diffusion between the land 7 and the groove 8 and the change of the magnetic characteristic at the side wall 9 separates the land 7 and the groove 8 magnetically, so that no move of the domain walls from a recording magnetic layer 105 on the land 7 to that on the groove 8 occurs, thus suppressing the cross-write and cross-erasure.

Seventh Embodiment

A method for forming the magneto-optical disk of the invention and a concrete example of record reproducing characteristics thereof will be explained below.

(1) Method for Forming Magneto-optical Disk:

The method for forming the magneto-optical disk constructed as described above will be explained. The substrate 1 made of polycarbonate, having guide grooves composed of lands 7 and grooves 8, in which the width of the land and groove is 0.55 μm each and the depth of the guide groove is 70 nm, and formed into the shape of a disk is disposed within a sputtering apparatus having an Si target, a TbFeCo alloy target and an AlTi alloy target. Here, an angle θ formed by the side wall 9 with each of the land 7 and the groove 8 was 85 degrees.

Then, after vacuuming the sputtering apparatus to $1 \times 10^{-6}$ Torr, mixed gas of argon and nitrogen was introduced and power was supplied to the Si target to form the first transparent dielectric layer 2 made of SiN to be 80 nm in thickness on the substrate 1 under the condition of $4 \times 10^{-3}$ Torr of gas pressure.

Next, after vacuuming the sputtering apparatus to $1 \times 10^{-6}$ Torr again, argon gas was introduced and power was supplied to the TbFeCo alloy target to form the recording magnetic layer 3 made of $Tb_{0.27}(Fe_{0.85}Co_{0.15})_{0.73}$ to be 50 nm in thickness on the first transparent dielectric layer 2 under the condition of $4 \times 10^{-3}$ Torr of gas pressure.

Then, the recording magnetic layer 3 on the side wall 9 was completely oxidized to form the oxide magnetic layer 103 and only the surface of the recording magnetic layer 3 on the land 7 and the groove 8 was oxidized to form the surface oxide magnetic layer 104, by taking out from the sputtering apparatus the substrate 1 on which the first transparent dielectric layer 2 and the recording magnetic layer 3 had been formed and by holding it in an atmosphere of 75° C. of temperature and 10% of humidity for two hours.

Next, the substrate 1 on which the surface oxidation of the recording magnetic layer 3 had been implemented was disposed within the sputtering apparatus,.and the surface oxide magnetic layer 104 formed on the surface of the recording magnetic layer 3 was removed by sputter-etching by introducing argon gas after vacuuming the sputtering apparatus to $1\times10^{-6}$ Torr under the conditions of 0.2 W/cm$^2$ of charged high-frequency power and $1\times10^{-6}$ Torr of gas pressure. The surface oxide magnetic layer 104 could be completely removed by sputter-etching the surface of the recording magnetic layer 3 by about 25 nm. Although the oxide magnetic layer 103 on the side wall 9 was also slightly sputter-etched, the oxide magnetic layer 103 of about 20 nm in thickness was left on the side wall part because the angle θ of the side wall 9 was as large as 85 degrees and the probability of collision of sputtering particles was low there. The recording magnetic layer 105 after the sputter-etching was a perpendicular magnetic film whose compensating temperature was 80° C. and whose Curie temperature was 260° C.

Then, mixed gas of argon and nitrogen was introduced and power was supplied to the Si target to form the second transparent dielectric layer 4 made of SiN to be 20 nm in thickness on the recording magnetic layer 3 which had been exposed by the sputter-etching under the condition of $4\times10^{-3}$ Torr of gas pressure.

Next, after vacuuming the sputtering apparatus to $1\times10^{-6}$ Torr again, argon gas was introduced and power, was supplied to the AlTi alloy target to form the reflecting layer 5 made of $Al_{0.90}Ti_{0.10}$ to be 50 nm in thickness on the second transparent dielectric layer 4 under the condition of $4\times10^{-3}$ Torr of gas pressure.

Then, the magneto-optical disk was fabricated by forming the overcoat layer 6 by irradiating ultraviolet rays to harden an ultraviolet hardening resin film after applying the resin by means of spin coating.

The first transparent dielectric layer 2 and the second transparent dielectric layer 4 are not limited to be SiN and a transparent dielectric such as AlN, AlSiN and $Ta_2O_3$ may be used in the magneto-optical disk described above. Its thickness must be set so as to realize a good interference effect with respect to an incident light beam and to increase a polar Kerr rotary angle of a medium. For instance, when the wavelength of the light beam is 680 nm, the thickness of the first transparent dielectric layer 2 may be set around 60 to 100 nm and the thickness of the second transparent dielectric layer 4 may be set around 10 to 30 nm.

The recording magnetic layer 3 is not also limited to be TbFeCo and it is possible to adopt a perpendicular magnetic film made of a material such as TbFe, DyFe, DyFeCo, TbDyFe, TbDyFeCo, TbFeD, TbFeCoD, DyFeD, DyFeCoD, TbDyFeD and TbDyFeCoD (D is an element or a plurality of elements selected among Y, Ti, V, Cr, Pd, Cu, Si and Al).

The condition of the sputter-etching of the surface oxide magnetic layer 104 is not also limited to be 0.2 W/cm$^2$ of high-frequency power and $1\times10^{-2}$ Torr of gas pressure. The high-frequency power is desirable to be 0.05 to 0.5 W/cm$^2$ and the gas pressure to be $1\times10^{-3}$ to $5\times10^{-2}$ Torr. It is unrealistic to use the power smaller than 0.05 W/cm$^2$ because etching rate becomes extremely slow in the sputter-etching and a processing time is prolonged. When power greater than 0.5 W/cm$^2$ is charged, the substrate made of polycarbonate deforms as the substrate temperature rises. It has been difficult to maintain stable discharge when the gas pressure is lower than $1\times10^{-3}$ Torr and higher than $5\times10^{-2}$ Torr.

The reflecting layer 5 is not also limited to be AlTi, and Al and an Al alloy such AlSi and AlNi may be used.

(2) Record Reproducing Characteristics:

The result of evaluation of the magneto-optical disk described above implemented by means of a magneto-optical pickup using a semiconductor laser of 680 nm of wavelength under the condition of 2.5 m/s of linear speed will be explained below.

At first, the following evaluation was carried out. A repetitive pattern of upward magnetization and downward magnetization corresponding to the direction of a recording magnetic field was formed in the recording magnetic layer 105, by tracking a light beam to scan a specific land 7 and by applying the recording magnetic field of 15 kA/m of intensity modulated by frequency of 2 MHz while continuously irradiating a record reproducing laser at 6 mW. Then, the record reproducing laser was set at 1 mW to measure a signal to noise ratio (CNR1) of the reproduced signal. As a result, CNR of 48.0 dB was obtained.

Next, the evaluation was carried out as follows. That is, the magnetizing direction of the neighboring groove 8 was uniformed in one direction by tracking a light beam to scan the neighboring groove 8 and by applying a magnetic field of fixed intensity of ±15 kA/m while continuously irradiating the record reproducing laser at 6 mW. Then, the record reproducing laser was set at 1 mW and the light beam was returned to the land 7 where the recording was made, to measure a signal to noise ratio (CNR2) of the reproducing signal again. As a result, it was found that CNR of 41.5 dB can be obtained.

Here, it is possible to estimate the quantity of cross-erasure by calculating the difference ΔCNR between CNR1 and CNR2 described above.

When ΔCNR of the magneto-optical disk of the invention fabricated in accordance to the method for forming the magneto-optical disk of the seventh embodiment was compared with that of the prior art magneto-optical disk (first comparative example) shown in the first embodiment, CNR1 was 48.5 dB, CNR2 was 36.0 dB and ΔCNR was 12.5 dB and a significant cross-erasure occurred by erasing the neighboring groove 8, thus remarkably dropping the CNR of the land 7, in the prior art magneto-optical disk of the first comparative example, while CNR1 was 48.0 dB, CNR2 was 41.5 dB and ΔCNR was 6.5 dB in the inventive magneto-optical disk of the invention of the present embodiment, and it was confirmed that the cross-erasure may be effectively suppressed.

It is noted that the thickness of the recording magnetic layer 3 formed on the side wall 9 must be fully smaller than the thickness of the recording magnetic layer 3 formed on the land 7 and the groove 8 in the invention. To that end, the angle θ formed by the side wall 9 with each of the land 7 and the groove 8 is desirable to be 60 degrees or more. When the angle θ is smaller than 60 degrees, the difference between the thickness of a recording magnetic layer 101 formed on the side wall 9 and the thickness of a recording magnetic layer 102 formed on the land 7 and the groove 8 becomes small and the non-oxidized recording magnetic layer 3 remains on the side wall 9 even after the surface oxide layer 103 is removed by means of sputter-etching. It is also desirable to thin the recording magnetic layer 101 formed on the side wall 9 as much as possible to implement the oxidation on the side wall 9 steadily, and the angle θ to be close to 90 degrees as much as possible in order to form the oxide magnetic layer 103 steadily on the side wall 9.

Although the recording magnetic layer 3 has been oxidized by holding it in an atmosphere of 75° C. of temperature and 10% of humidity for two hours in the seventh embodiment, it is possible to shorten the holding time by raising the holding temperature. It becomes possible to form the magneto-optical disks continuously without taking the substrate 1 from the sputtering apparatus by oxidizing the recording magnetic layer 3 by exposing it to the oxygen plasma. It becomes also possible to oxidize the recording magnetic layer 3 in a shorter time because the oxidation proceeds in the activated oxygen plasma.

Further, although the magnetic layer formed on the side wall 9 has been oxidized by providing the selective oxide layer 11 in the first embodiment, the manufacturing method of the seventh embodiment allows the manufacturing process to be simplified because no selective oxide layer needs to be provided.

Eight Embodiment

A case when the invention is applied to a super-resolution magneto-optical disk in which at least a reproducing magnetic layer 15 and a recording magnetic layer 17 are magneto-statically combined will be explained below in detail.

Similarly to the second embodiment, the method shown in the present embodiment also allows only the reproducing magnetic layer 15 and the recording magnetic layer 17 formed on the side wall 9 to be the oxide magnetic layer 103 and thereby, cross-talk, cross-write and cross-erasure to be suppressed from occurring.

Next, a method for forming the magneto-optical disk of the invention and a concrete example of the record reproducing characteristics thereof will be explained below.

(1) Method for Forming Magneto-Optical Disk:

The method for forming the magneto-optical disk constructed as described above will be explained. The substrate 1 made of polycarbonate, having guide grooves composed of lands 7 and grooves 8 in which the width of the land and groove is 0.45 μm each and the depth of the guide groove is 70 nm, and formed into the shape of a disk is disposed within a sputtering apparatus having an Si target, a GdFeCo alloy target and a TbFeCo alloy target. Here, an angle θ formed by the side wall 9 with each of the land 7 and the groove 8 was 85 degrees.

Then, after vacuuming the sputtering apparatus to $1 \times 10^{-6}$ Torr, mixed gas of argon and nitrogen was introduced and power was supplied to the Si target to form the transparent dielectric layer 14 made of SiN to be 80 nm in thickness on the substrate 1 under the condition of $4 \times 10^{-3}$ Torr of gas pressure.

Next, after vacuuming the sputtering apparatus to $1 \times 10^{-6}$ Torr again, argon gas was introduced and power was supplied to the GdFeCo alloy target to form the reproducing magnetic layer 15 made of $Gd_{0.31}(Fe_{0.80}Co_{0.20})_{0.69}$ to be 60 nm in thickness on the transparent dielectric layer 14 under the condition of $4 \times 10^{-3}$ Torr of gas pressure.

Then, after vacuuming the sputtering apparatus to $1 \times 10^{-6}$ Torr, the reproducing magnetic layer 15 was oxidized by introducing oxygen gas to the sputtering apparatus, by charging high-frequency power of 0.08 W/cm² to the electrode side where the substrate 1 was disposed and by exposing the reproducing magnetic layer 15 to the oxygen plasma for 3.5 minutes.

Next, after vacuuming the sputtering apparatus to $1 \times 10^{-6}$ Torr, the surface oxide layer 104 on the reproducing magnetic layer 15 was removed by about 30 nm by means of sputter-etching by introducing argon gas under the conditions of 0.2 W/cm² of charged high-frequency power and $1 \times 10^{-2}$ Torr of gas pressure.

The surface oxide layer 104 on the reproducing magnetic layer 15 could be completely removed by sputter-etching by about 30 nm. Here, the oxide magnetic layer 103 on the side wall 9 is also slightly sputter-etched. However, because the angle θ of the side wall 9 is as large as 85 degrees and the probability of collision of sputtering particles is low, the oxide magnetic layer 103 of 25 nm in thickness was left on the side wall part. The reproducing magnetic layer 15 which is about 30 nm in thickness after sputter-etching, has a characteristic that it is put into the in plane magnetizing state in room temperature and is put into the perpendicular magnetizing state as temperature rises. Its Curie temperature was 320° C.

Then, mixed gas of argon and nitrogen was introduced and power was supplied to the Si target to form the non-magnetic intermediate layer 16 made of SiN to be 20 nm in thickness on the reproducing magnetic layer 15 under the condition of $4 \times 10^{-3}$ Torr of gas pressure.

Then, after vacuuming the sputtering apparatus to $1 \times 10^{-6}$ Torr again, argon gas was introduced and power was supplied to the TbFeCo alloy target to form the recording magnetic layer 17 made of $Tb_{0.24}(Fe_{0.85}Co_{0.15})_{0.76}$ to be 40 nm in thickness on the non-magnetic intermediate layer 16 under the condition of $4 \times 10^{-3}$ Torr of gas pressure. The recording magnetic layer 17 was a perpendicular magnetic film whose compensating temperature was 25° C. and whose Curie temperature was 280° C.

Then, mixed gas of argon and nitrogen was introduced and power was supplied to the Si target to form the protection layer 18 made of SiN to be 20 nm in thickness on the recording magnetic layer 17 under the condition of $4 \times 10^{-3}$ Torr of gas pressure.

Then, the magneto-optical disk was fabricated by forming the overcoat layer 6 by irradiating ultraviolet rays to harden an ultraviolet hardening resin film after applying the resin by means of spin coating.

(2) Record Reproducing Characteristics:

When the magneto-optical disk described above was evaluated by means of a magneto-optical pickup using a semiconductor laser of 680 nm of wavelength under the condition of 2.5 m/s of linear speed, the same degree of record reproducing characteristics with the super-resolution magneto-optical disk described in the fifth embodiment was obtained as a result. The cross-talk was considerably reduced; conceivably because the reproducing magnetic layer 15 on the side wall 9 was oxidized to form the oxide magnetic layer 103, thereby reducing the thermal conductivity at the side wall 9 and suppressing the thermal diffusion from the land 7 to the groove 8, which the in-plane magnetic anisotropy of the oxide magnetic layer 103 on the side wall 9 increased, resulting that the magnetic coupling of the land 7 with the groove 8 was shut off at the side wall 9.

Still more, although the eighth embodiment shows that the cross-talk may be suppressed by forming the oxide magnetic layer 103 on the side wall 9 of the reproducing magnetic layer 15, it is also possible to suppress cross-write and cross-erasure by forming the oxide magnetic layer 103 on the side wall 9 of the recording magnetic layer 17 as well.

Although the selective oxidation using the oxygen plasma has been described in the eighth embodiment, the first magnetic layer 19 may be oxidized by holding in the oxygen atmosphere. Still more, the angle θ formed by the side wall 9 with each of the land 7 and the groove 8 is desirable to be 60 degrees or more similarly to the seventh embodiment.

Although the magnetic layer formed on the side wall 9 has been oxidized by providing the selective oxide layer 11 in the fifth embodiment, the manufacturing method of the eighth embodiment allows the manufacturing process to be simplified because no selective oxide layer needs to be provided.

Ninth Embodiment

A case when the present embodiment is applied to a domain wall moving magneto-optical disk described in JP-A 6-290496 will be explained below in detail by using the drawings.

A magneto-optical disk of the present embodiment has the same structure with the magneto-optical disk of the third embodiment and as shown in FIG. 5, has the structure in which a transparent dielectric layer 14 made of SiN, a first magnetic layer 19 whose domain wall coercivity is relatively small, a second magnetic layer 20 whose Curie temperature is relatively low, a third magnetic layer 21 whose domain wall coercivity is relatively large and Curie temperature is relatively high, a protection layer 18 made of SiN and an overcoat layer 6 made of ultraviolet hardening resin are formed one after another on the substrate 1.

The ninth embodiment realizes the high density record reproduction by separating the domain walls before and after the recording mark in the first magnetic layer 19 to move the domain walls by forming only the first magnetic layer 19 on the side wall 9 as the oxide magnetic layer 103. A method for forming the magneto-optical disk of the invention and a concrete example of the record reproducing characteristics thereof will be explained below.

(1) Method for Forming Magneto-Optical Disk:

The method for forming the magneto-optical disk constructed as described above will be explained. The substrate 1 made of polycarbonate, which has guide grooves having a depth of 70 nm, which are composed of the lands 7 and grooves 8 having a width of 0.45 μm, and is formed into the shape of a disk, is disposed within a sputtering apparatus having an Si target, a GdFeSi alloy target, a TbFe alloy target and a TbFeCo alloy target. Here, an angle θ formed by the side wall 9 with each of the land 7 and the groove 8 was 85 degrees.

Then, after vacuuming the sputtering apparatus to $1 \times 10^{-6}$ Torr, mixed gas of argon and nitrogen was introduced and power was supplied to the Si target to form the transparent dielectric layer 14 made of SiN to be 80 nm in thickness on the substrate 1 under the condition of $4 \times 10^{-3}$ Torr of gas pressure.

Next, after vacuuming the sputtering apparatus to $1 \times 10^{-6}$ Torr again, argon gas was introduced and power was supplied to the GdFeSi alloy target to form the first magnetic layer 19 made of $(Gd_{0.27}Fe_{0.73})_{0.85}Si_{0.15}$ to be 60 nm in thickness on the transparent dielectric layer 14 under the condition of $4 \times 10^{-3}$ Torr of gas pressure.

Then, after vacuuming the sputtering apparatus to $1 \times 10^{-6}$ Torr, the first magnetic layer 19 was oxidized by introducing oxygen gas to the sputtering apparatus, by charging high-frequency power of 0.05 W/cm² to the electrode side where the substrate 1 is disposed and by exposing the first magnetic layer 19 to the oxygen plasma for 4.5 minutes under the condition of $1 \times 10^{-2}$ Torr of gas pressure.

Next, after vacuuming the sputtering apparatus to $1 \times 10^{-6}$ Torr, the surface oxide layer 104 of the first magnetic layer 19 was removed by about 30 nm by means of sputter-etching by introducing argon gas under the conditions of 0.2 W/cm² of charged high-frequency power and $1 \times 10^{-2}$ Torr of gas pressure.

The surface oxide layer 104 of the first magnetic layer 19 could be completely removed by sputter-etching by about 30 nm. Here, the oxide magnetic layer 103 on the side wall 9 was also slightly sputter-etched, however, because the angle θ of the side wall 9 was as large as 85 degrees and the probability of collision of sputtering particles was low, the oxide magnetic layer 103 of 25 nm in thickness was left on the side wall part. The first magnetic layer 19 was a perpendicular magnetizing film whose compensating temperature was 140° C. and whose Curie temperature was 180° C.

Next, power was supplied to the TbFe alloy target while introducing the argon gas to form the second magnetic layer 20 made of $Tb_{0.25}Fe_{0.75}$ to be 20 nm in thickness on the first magnetic layer 19 under the condition of $4 \times 10^{-3}$ Torr of gas pressure. The second magnetic layer 20 was a perpendicular magnetizing film whose compensating temperature was 25° C. and whose Curie temperature was 140° C.

Next, power was supplied to the TbFeCo alloy target while introducing the argon gas to form the third magnetic layer 21 made of $Tb_{0.27}(Fe_{0.5}Co_{0.15})_{0.73}$ to be 20 nm in thickness on the second magnetic layer 20 under the condition of $4 \times 10^{-3}$ Torr of gas pressure. The third magnetic layer 21 was a perpendicular magnetizing film whose compensating temperature was 80° C. and whose Curie temperature was 260° C.

Then, mixed gas of argon and nitrogen was introduced and power was supplied to the Si target to form the protection layer 18 made of SiN to be 20 nm in thickness on the third magnetic layer 21 under the condition of $4 \times 10^{-3}$ Torr of gas pressure.

Then, the magneto-optical disk was fabricated by forming the overcoat layer 6 by irradiating ultraviolet rays to harden an ultraviolet hardening resin film after applying the resin by means of spin coating.

(2) Record Reproducing Characteristics:

The result of evaluation of the magneto-optical disk described above implemented by means of a magneto-optical pickup using a semiconductor laser of 680 nm of wavelength under the condition of 2.5 m/s of linear speed will be explained below.

The signal to noise ratio (CNR) of a reproduced signal was measured by forming a repetitive pattern of upward magnetization and downward magnetization corresponding to the direction of a recording magnetic field in the third magnetic layer 21 by tracking a light beam to scan a specific land 7 and by applying the recording magnetic field of 15 kA/m of intensity modulated by frequency of 5 MHz while continuously irradiating a record reproducing laser at 7 mW and then by setting the record reproducing laser at 2.4 mW. As a result, it was confirmed that 41 dB of CNR was obtained and a rectangular reproducing waveform caused by the move of domain walls was obtained.

Meanwhile, when the record was reproduced in the same manner with a magneto-optical disk formed without oxidizing and without implementing sputter-etching of the first magnetic layer 19, no rectangular reproducing waveform was seen with the move of domain walls and CNR of only about 20 dB was obtained.

Thus, it becomes possible to realize the high density record reproduction, to improve the mass-productivity of the domain wall moving magneto-optical disk and to realize the low cost, by separating the domain walls before and after the recording mark in the first magnetic layer 19 and by moving the domain walls by forming the oxide magnetic layer 103 only at the part of the side wall 9 of the first magnetic layer 19 instead of implementing the process of decomposing or eliminating the magnetic film on the sides of a track by annealing the both sides of the track by high output laser after forming the magnetic film.

Although only the case of forming the oxide magnetic layer 103 on the side wall 9 of the first magnetic layer 19 necessary for the reproducing operation has been described here, it is also possible to reduce cross-write and cross-erasure by forming the oxide magnetic layer 103 on the side wall 9 of the second magnetic layer 20 and the third magnetic layer 21 after forming the second magnetic layer 20 and the third magnetic layer 21.

Further, although the oxidation using the oxygen plasma has been described in the ninth embodiment, the first magnetic layer 19 may be oxidized by holding within the oxygen atmosphere. Further, the angle θ formed by the side wall 9 with each of the land 7 and the groove 8 is desirable to be 60 degrees or more similarly to the seventh embodiment.

Still more, although the magnetic layer formed on the side wall 9 has been oxidized by providing the selective oxide layer 11 in the sixth embodiment, the manufacturing method of the ninth embodiment allows the manufacturing process to be simplified because no selective oxide layer needs to be provided.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An optical memory device comprising:
    a substrate provided with a land and a groove which form an information track, and a side wall portion between the land and the groove; and
    a recording magnetic layer for optically recording information or reproducing the recorded information laminated on the substrate,
    wherein only side wall portions of the recording magnetic layer are selectively oxidized.

2. An optical memory device comprising:
    a substrate provided with a land and a groove which form an information track, and a side wall portion between the land and the groove;
    a recording magnetic layer for optically recording information or reproducing the recorded information laminated on the substrate,
    wherein only side wall portions of the recording magnetic layer are selectively oxidized; and
    a reproducing magnetic layer for optically reproducing information recorded in the recording magnetic layer by transferring the information thereto.

3. An optical memory device, comprising:
    a substrate provided with a land and a groove which form an information track;
    a first magnetic layer having relatively small domain wall coercivity,
    part of the first magnetic layer which forms side wall portions between the land and the groove being selectively oxidized;
    a second magnetic layer having relatively low Curie temperature;
    a third magnetic layer having relatively large domain wall coercivity and high Curie temperature,
    the first magnetic layer, the second magnetic layer and the third magnetic layer being laminated on the substrate in this order.

4. An optical memory device for magneto-optically recording information or for reproducing the magneto-optically recorded information, comprising:
    a substrate provided with a land and a groove both of which serve as information tracks, and a side wall portion between the land and the groove;
    at least one magnetic layer,
    wherein only side wall portions of the magnetic layer are selectively oxidized.

5. A method for manufacturing an optical memory device for magneto-optically recording information or for reproducing the magneto-optically recorded information, comprising:
    a substrate provided with a land and a groove both of which serve as information tracks;
    at least one magnetic layer,
    part of the one magnetic layer which forms side wall portions between the land and the groove being selectively oxidized,
    comprising the steps of:
        forming a magnetic layer on a substrate provided with a land and a groove so as to be thick in the land and groove portions of the substrate and be thin in portions of side walls between the land and the groove;
        oxidizing the magnetic layer by holding the magnetic layer in an oxygen atmosphere or oxygen plasma to form a selective oxide layer which is thin in the land and groove portions and thick in the side wall portions.

6. A method for manufacturing an optical memory device for magneto-optically recording information or for reproducing the magneto-optically recorded information, comprising:
    a substrate provided with a land and a groove both of which serve as information tracks;
    at least one magnetic layer,
    part of the one magnetic layer which forms side wall portions between the land and the groove being selectively oxidized,
    comprising the steps of:
        forming a magnetic layer on a substrate provided with a land and a groove;
        oxidizing the magnetic layer by holding the magnetic layer in an oxygen atmosphere or oxygen plasma; and
        removing the oxidized magnetic layer on the land and groove portions of the substrate by means of sputter-etching.

7. An optical memory device comprising:
    a substrate provided with a land and a groove which form an information track, and a side wall portion between the land and the groove; and
    a recording magnetic layer for optically recording and reproducing information laminated on the substrate,
    wherein only side wall portions of the recording magnetic layer are selectively oxidized; and wherein an angle θ formed by the side wall with each of the land and the groove is within a range of θ≧60°.

8. An optical memory device comprising:

a substrate provided with a land and a groove which form an information track, and a side wall portion between the land and the groove;

a recording magnetic layer for optically recording information or reproducing the recorded information laminated on the substrate, wherein only side wall portions of the recording magnetic layer are selectively oxidized; and a reproducing magnetic layer for optically reproducing information recorded in the recording magnetic layer by transferring the information thereto; and wherein an angle θ formed by the side wall with each of the land and the groove is within a range of θ≧60°.

9. An optical memory device, comprising:

a substrate provided with a land and a groove which form an information track;

a first magnetic layer having relatively small domain wall coercivity, part of the first magnetic layer which forms side wall portions between the land and the groove being selectively oxidized;

a second magnetic layer having relatively low Curie temperature;

a third magnetic layer having relatively large domain wall coercivity and high Curie temperature, the first magnetic layer, the second magnetic layer and the third magnetic layer being laminated on the substrate in this order;

wherein an angle θ formed by the side wall with each of the land and the groove is within a range of θ≧60°.

10. An optical memory device for magneto-optically recording information or for reproducing the magneto-optically recorded information, comprising:

a substrate provided with a land and a groove both of which serve as information tracks;

at least one magnetic layer, part of the one magnetic layer which forms side wall portions between the land and the groove being selectively oxidized; and wherein an angle θ formed by the side wall with each of the land and the groove is within a range of θ≧60°.

* * * * *